UNITED STATES PATENT OFFICE.

ANTON VASTAG AND STEFAN HORVATH, OF McKEES ROCKS, PENNSYLVANIA.

COMPOSITION OF MATTER.

952,389.     Specification of Letters Patent.     Patented Mar. 15, 1910.

No Drawing.     Application filed August 7, 1909. Serial No. 511,809.

*To all whom it may concern:*

Be it known that we, ANTON VASTAG and STEFAN HORVATH, subjects of the King of Hungary, residing at McKees Rocks, in the county of Allegheny and State of Pennsylvania, have invented certain new and useful Improvements in Composition of Matter, of which the following is a specification.

This invention relates to a new and useful composition of matter to be used as a solder or brazing material in connecting the confronting ends of two pieces of copper, for instance, a trolley wire.

Our composition consists of the following ingredients, combined in the proportion stated, viz:

Copper _____ 38 grains.
    Borax _____ 35 grains.

These ingredients are applied to the confronting ends of two pieces of copper and then the confronting ends are subjected to the action of a fire.

In using the above named ingredients, the ends of two pieces of copper can be fixed together as though they were one piece, the connection being as strong and durable as a solid piece of copper.

We claim:—

The hereindescribed composition of matter for welding and brazing purposes consisting of 35 grains of borax and 38 grains of copper.

In testimony whereof we affix our signatures in the presence of two witnesses.

ANTON VASTAG.
    STEFAN HORVATH.

Witnesses:
    JAN POPSAN,
    JOSEF TELLER.